March 2, 1943.  C. E. MORRIS  2,312,666
COTTON CHOPPER
Filed Jan. 22, 1940  3 Sheets-Sheet 1
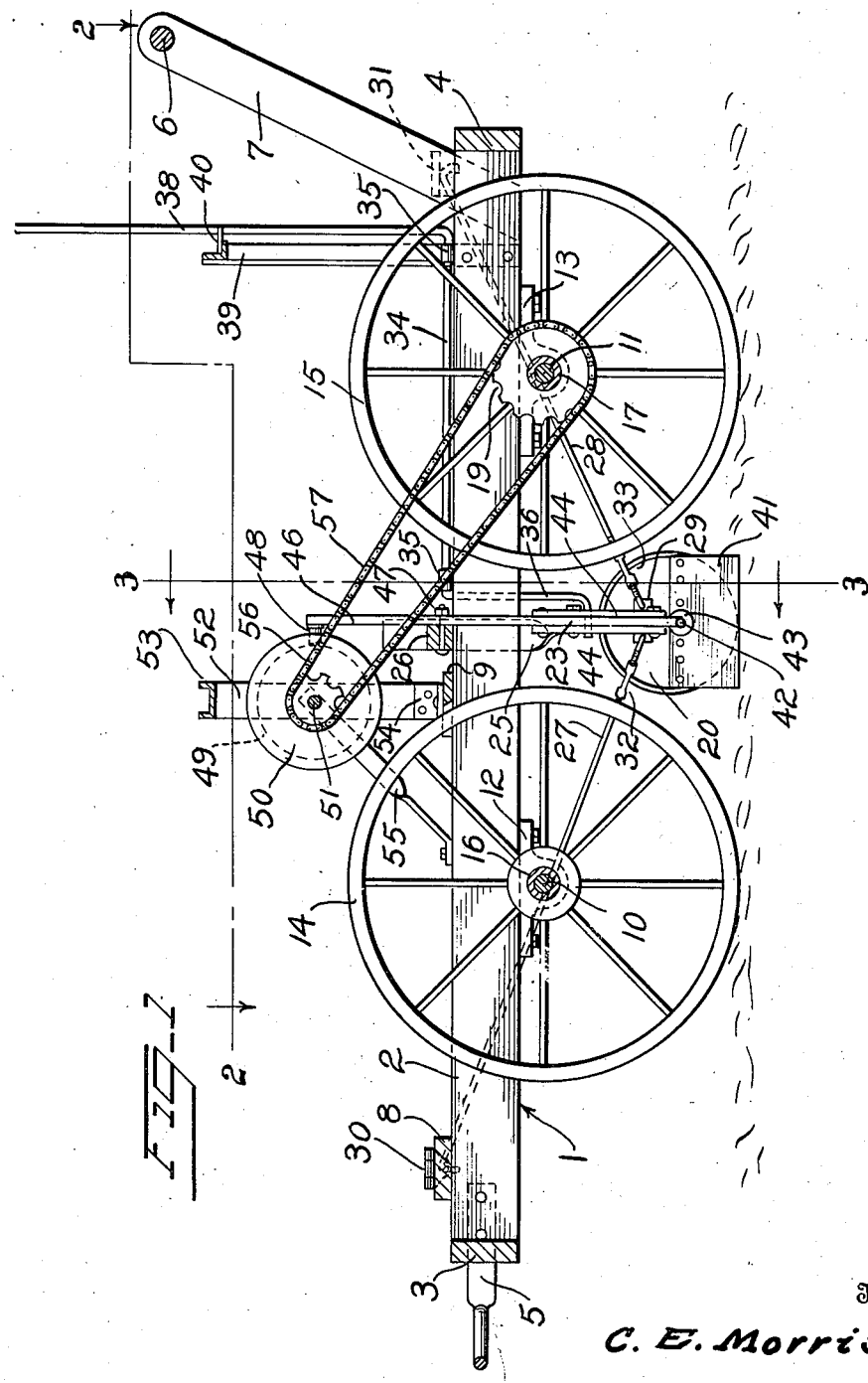
Inventor
C. E. Morris.
By Lacey & Lacey,
Attorneys

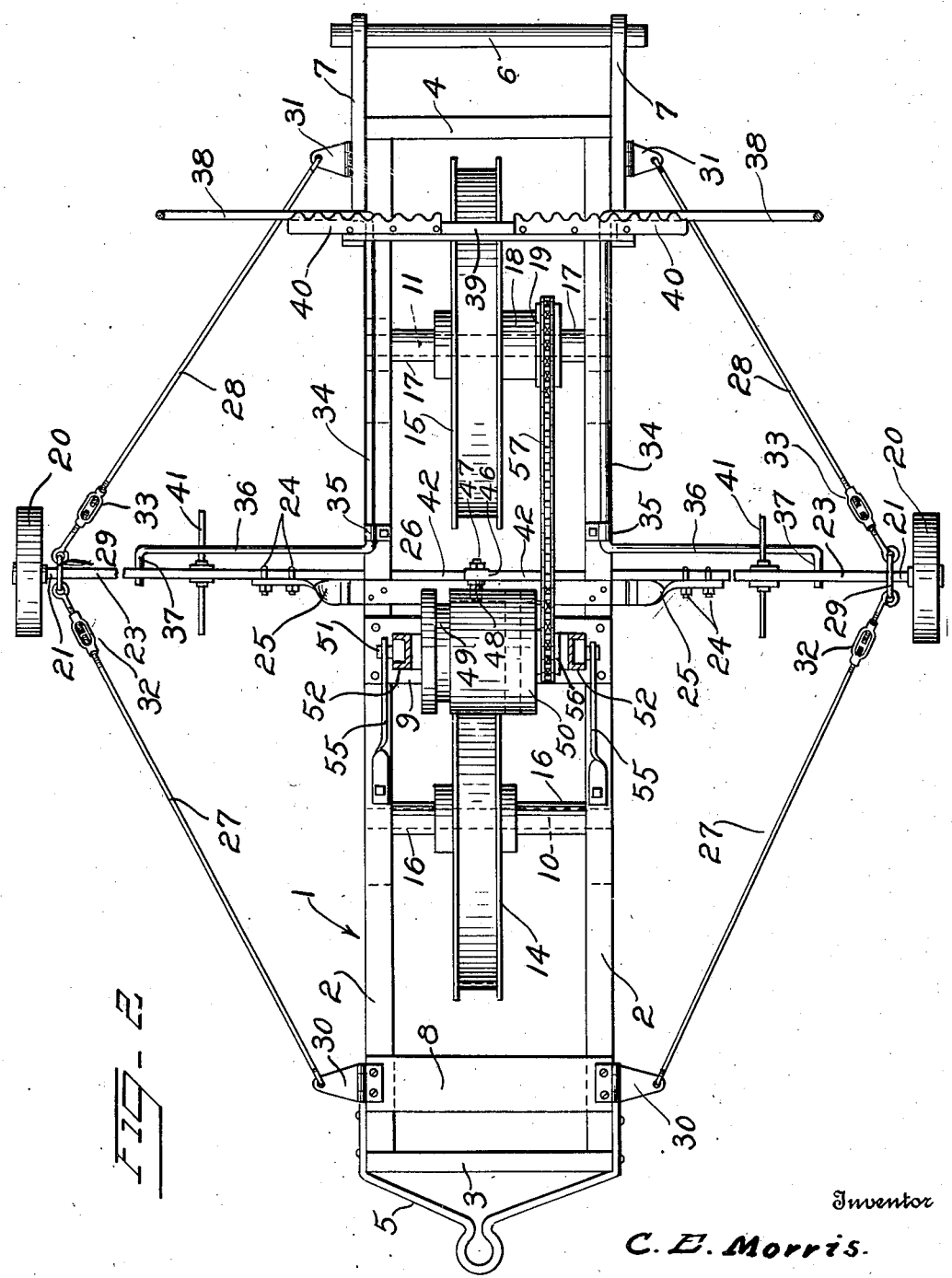

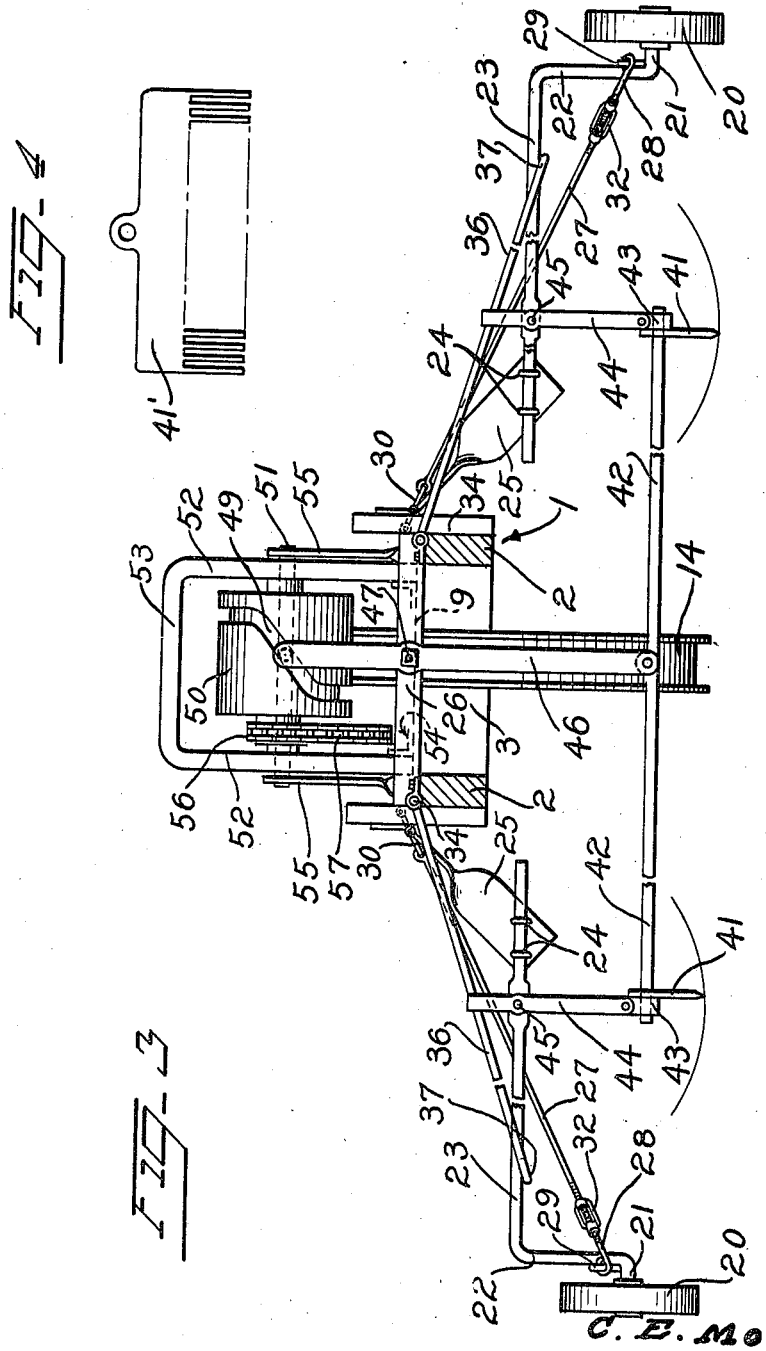

Patented Mar. 2, 1943

2,312,666

UNITED STATES PATENT OFFICE 2,312,666

COTTON CHOPPER

Charles E. Morris, Little Rock, Ark.

Application January 22, 1940, Serial No. 315,121

6 Claims. (Cl. 97—19)

This invention relates to a cotton chopper, and it is one object of the invention to provide a device of this character which may be drawn across a field in straddling relation to two rows of growing plants and plants chopped from the rows at intervals so that plants will be left growing in the rows in spaced relation to each other longitudinally thereof and thus properly space the growing plants from each other.

Another object of the invention is to so construct the machine that a cam roller for actuating the lever by means of which movement is imparted to the chopping blade may have rotary motion transmitted to it from the rear ground-engaging wheels of the cotton chopper, thus permitting the chopping mechanism to be powered from the rear wheel and eliminating the necessity of an engine or other power means for driving the cam roller.

Another object of the invention is to provide a cotton chopper wherein the frame is supported by a single front wheel and a single back wheel, both wheels being mounted midway the width of the frame and the rear wheel following in the path of the front wheel. It will thus be seen that a relatively narrow frame may be provided supported by wheels which may travel across a field between rows of growing plants.

Another object of the invention is to provide the cotton chopper with bracing rollers mounted in spaced relation to opposite sides of the frame in such position that they may rest upon the ground at opposite sides of the rows between which the cotton chopper is traveling, the rollers serving to prevent transverse tilting of the frame and the mounting means for these rollers also constituting means for carrying the chopping blades which are to be moved transversely as the cotton chopper is driven across a field and chop out plants from the rows.

Another object of the invention is to so mount the laterally extending roller carrying arms that these arms may be swung upwardly out of engagement with the ground when a turn is to be made at the end of a field and also permit a chopping blade at one side of the cotton chopper to be held in an elevated or inoperative position when it is only desired to use one of the chopping blades.

Another object of the invention is to provide improved means for vertically adjusting the roller carrying arms and holding the same in the adjusted position, this means including levers pivoted at sides of the main frame of the cotton chopper in such position that they may be easily reached by a person walking back of the chopper.

Another object of the invention is to provide a cotton chopper which is of comparatively simple construction, easy to operate and not liable to get out of order.

The invention is illustrated in the accompanying drawings, wherein

Figure 1 is a vertical sectional view taken longitudinally through the improved cotton chopper, Figure 2 is a top plan view of the cotton chopper with portions shown in section, the view being taken along the line 2—2 of Figure 1, Figure 3 is a vertical sectional view taken transversely through the cotton chopper along the line 3—3 of Figure 1, and Figure 4 is a view of a rake which may be used in place of a hoe blade.

This improved cotton chopper has a main frame, indicated in general by the numeral 1, and consisting of side bars 2 connected at their front and rear ends by cross bars 3 and 4. A yoke 5 to which a draft animal will be attached is mounted at the front of the main frame with its arms secured against outer side faces of the side bars and at the back of the frame there has been provided a handle 6 carried by arms 7 which are secured to the rear end portions of the side bars and extend upwardly at a rearward incline. The handle will be grasped by the operator of the chopper who walks back of the machine. A cross bar 8 is secured upon upper edge faces of the side bars adjacent their forward ends and an intermediate cross bar 9 extends between the side bars where it is secured upon their upper edge faces substantially midway the length of the main frame. Front and rear axles 10 and 11 extend transversely of the main frame under the same with their ends mounted in the bearings 12 and 13, and upon these axles are mounted the front and rear wheels 14 and 15, spacers 16 and 17 being provided upon the axles at opposite sides of the wheels to maintain the wheels midway the width of the main frame. The rear wheel has an elongated hub 18 which projects from one side of the wheel, as shown in Figure 2, and this hub carries a sprocket wheel 19 constituting a power take-off.

In order to brace the cotton chopper against transverse tilting when it is in use and being drawn across a field, there have been provided ground-engaging rollers or small wheels 20 which are spaced from opposite sides of the main frame and rotatably mounted upon the spindles 21 formed by bending outwardly the depending end portion 22 of the arms 23. These arms 23 extend horizontally when in a lowered position to dispose the rollers 20 in engagement with the ground and their inner end portions are secured by clamps 24 to mounting strips or blades 25. These blades or strips extend from opposite sides of the main frame and have their inner ends hinged to a cross bar 26 which extends across the main frame back of the intermediate cross bar or plate 9 and secured upon the upper edge faces of the side bars 2. Bracing rods 27 and 28 have their outer ends engaged with plates 29 at the inner ends of the spindles 21, and these bracing rods extend forwardly and rearwardly of the cotton chopper with their inner ends connected with hinges 30 and 31 carried by the cross bar 8 and rear end portions of the side bars 2. By adjusting the turn-buckles 32 and 33 the bracing rods may be lineally adjusted so that they will brace the arms 23 against strain longitudinally of the cotton chopper and at the same time permit the arms 23 and the strips 25 to which they are secured to be swung vertically when the rollers or wheels 20 are to be moved into or out of engagement with the ground.

In order to shift the arms 23 vertically, there have been provided rocker shafts 34 which extend longitudinally of the main frame at opposite sides thereof and are rotatably mounted in bearings 35 carried by the side bars 2. Each rocker shaft has its forward end portion bent to form an outwardly extending arm 36 terminating in a side extension or finger 37 which engages under the companion arm 23 and the rear end portion of each rocker shaft is bent to form a lever 38 extending upwardly, as shown in Figure 1, and disposed at an outward incline, as shown in Figure 2, when the arm 36 is in its lowered position. A yoke 39 which is formed of angle metal and of an inverted U-shape is mounted in an upright position across the rear portion of the main frame in front of the arms 7 of the handle and the bridge portion of this yoke carries rack plates 40 which extend horizontally, as shown in Figure 2, and project outwardly from opposite sides of the yoke. These rack plates are formed with teeth along their rear edges for engagement by the levers 38, and it will be readily apparent that, when the operator of the cotton chopper grasps each of the levers 38 and swings it inwardly, the arm 23 engaged by the arm 36 companion to this lever will be swung upwardly to a raised position in which the roller 20 carried by this arm 23 will be maintained out of engagement with the ground. In view of the fact that the lever 38 will engage the teeth of the cooperating rack plate, the arm 23 will be maintained in the raised position until the lever is released and swung outwardly to lower the arm 23. When a turn is to be made at the end of a field, both of the rollers 20 may be swung upwardly out of engagement with the ground and a quick turn made.

The chopping members which may be hoe blades 41 as shown in Figures 1, 2 and 3 or rakes 41' as shown in Figure 4 are disposed in spaced relation to the opposite sides of the main frame in order that, when the cotton chopper is drawn across a field with the wheels 14 and 15 resting upon the ground between two rows of plants, the blades will be in proper position to chop plants from the two rows. These blades are carried by rods or bars 42 which extend transversely of the main frame and at their ends carry bearing brackets 43 to which are pivoted the lower ends of hangers 44. These hangers extend vertically and at their upper ends are pivoted to the arms 23 outwardly of the strips or plates 25, as shown at 45. It will thus be seen that the blades 41 will be mounted for swinging movement transversely of the chopper and as they move through the rows of growing plants, certain of the plants will be chopped from the rows and others in spaced relation to each other left growing. In order to impart oscillating movement to the hangers 44 and blades 41, the inner ends of the rods 42 are pivoted to the lower end of a lever 46 which extends vertically and in spaced relation to its upper end and is pivoted to the cross bar 26 by a bolt 47. The upper end of the lever 46 carries a pin 48 engaged in a groove 49 formed in a cam roller 50 which is mounted upon the shaft or axle 51 rotatably mounted between the arms 52 of the yoke 53. This yoke which is formed of channeled metal and is of an inverted U-shape is disposed in an upright position transversely of the main frame and lower ends of the arms 52 are secured upon the cross bar or plate 9 by brackets 54. Braces 55 for maintaining the yoke in its upright position extend forwardly from the yoke with their upper rear ends engaged about ends of the axle 51 and their lower forward ends secured upon the upper edge faces of the side bars. At one end of the cam roller is provided a sprocket wheel 56 and about this sprocket wheel is engaged a sprocket chain 57 which extends rearwardly therefrom at a downward incline and is engaged about the sprocket wheel 19. Since the sprocket chain is engaged about the sprocket wheel 19 carried by the hub of the rear wheel 15, power for rotating the cam roller 50 will be transmitted from the rear wheel 15 and driving means for the cam roller other than the rear wheel 15 is not needed.

When this cotton chopper is in use, a draft animal is connected with the yoke 5 and driven across the field so that the cotton chopper will be drawn across the field between a pair of rows of plants. During this forward movement of the cotton chopper, the rollers 20 will rest upon the ground at opposite sides of the two rows of plants and the blades 41 are oscillated back and forth through the rows of growing plants as the lever 46 is swung about its pivot 47. It will thus be seen that the blades will move through the rows of growing plants transversely thereof in one direction and then move through them in an opposite direction, but as the machine is continuously moving forwardly, the plants will only be chopped out of the rows at intervals and growing plants in spaced relation to each other will be left growing in the rows. When a turn is to be made at an end or side of a field, the levers 38 will be swung inwardly to raise the arms 23 and lift the rollers 20 out of engagement with the ground and a quick turn may then be made to reverse the position of the cotton chopper for a return trip across the field. If for any reason it is desired to only chop the plants from one row, one of the arms 23 may be secured in its raised position and only the chopping blades at the other side of the cotton chapper will be disposed in position for use. By adjusting the arms 23 through the clamps 24 and similarly adjusting the bearings 43 along the rods 42, the blades 41 may be adjusted to accommodate themselves to the distance between the rows of plants.

Having thus described the invention, what is claimed as new is:

1. In a cotton chopper, a main frame, front and rear wheels for the main frame rotatably mounted intermediate the width thereof, supports at opposite sides of said main frame mounted for vertical swinging adjustment towards and away from the ground, choppers carried by said supports at opposite sides of the main frame and pivotally mounted for transverse movement, and actuating means for said choppers including a vertical lever pivotally mounted intermediate the width of the frame, rods connecting the lower end of said lever with said choppers, and means for imparting swinging movement to said lever carried by said frame and actuated from one of said wheels.

2. In a cotton chopper, a main frame, wheels for said frame, supporting frames at opposite sides of the main frame mounted for vertical swinging movement into and out of a lowered ground-engaging position, hangers pivoted to said supporting frames, blades carried by said hangers, rods extending inwardly from the hangers, a lever disposed vertically and pivoted to said main frame, said lever having its lower end pivoted to inner ends of said rods, a rotary cam engaged by the upper end of said lever for imparting swinging movement to the lever transversely of the frame when the cam is rotating, and means for transmitting rotary movement from one wheel to said cam.

3. In a cotton chopper, a main frame, wheels for the main frame, supporting arms extending laterally from opposite sides of the main frame and mounted for vertical swinging adjustment from a raised position to a lowered position for use, front and rear bracing rods for said supporting arms extending from their outer ends towards front and rear ends of the main frame and pivoted to the main frame, rocker shafts extending longitudinally of the main frame and having arms extending from their forward ends outwardly of the main frame and engaging said supporting arms, levers at rear ends of the rocker shafts for turning the rocker shafts and imparting swinging movement to the arms for vertically adjusting the supporting arms, means for securing said levers in set position, choppers carried by said supporting arms, a lever disposed vertically and pivotally mounted upon the main frame, pitman rods having their outer ends connected with said choppers and their inner ends pivoted to the lower end of said lever, and means for imparting swinging movement to said lever and effecting operation of the choppers.

4. In a cotton chopper, a main frame, arms extending laterally from opposite sides of the main frame, hinged members pivoted at opposite sides of the main frame, clamps adjustably securing said arms to said hinge members, choppers carried by said arms and mounted for swinging movement transversely of the main frame, and actuating means for said choppers carried by the main frame.

5. In a cotton chopper, a main frame, supporting arms extending laterally from opposite sides of the main frame and pivotally mounted for vertical swinging adjustment from a raised position to a lowered position for use, rocker shafts extending longitudinally of the frame and having outwardly extending arms engaging the supporting arms for swinging the supporting arms vertically and holding the same in set positions, said supporting arms having outer sections shiftable longitudinally, choppers carried by the outer sections of the supporting arms and spaced predetermined distances from opposite sides of the main frame by shifting of the said outer sections longitudinally to adjusted positions, and actuating means for said choppers carried by the main frame.

6. In a cotton chopper, a main frame, supports extending from opposite sides of the main frame and pivoted at their inner ends, levers carried by said frame for swinging the supports vertically and retaining the same in adjusted positions, hangers pivoted to said supports and disposed vertically, blades at lower ends of said hangers, pitman rods extending horizontally with their outer ends connected with the hangers, a vertically disposed lever pivotally mounted to the frame and having its lower end pivotally connected to inner ends of said pitman rods, a cam roller, a yoke rising from the frame and rotatably mounting the roller above said main frame, said lever having its upper end engaged in said cam roller, and means for rotating said roller to impart swinging movement to the lever transversely in the main frame and impart swinging movement to the hangers and the chopper carried thereby.

CHARLES E. MORRIS.